(12) United States Patent
Fujii et al.

(10) Patent No.: US 7,109,620 B2
(45) Date of Patent: Sep. 19, 2006

(54) MOTOR AND DISPLAY UNIT (75) Inventors: Yoshio Fujii, Kyoto (JP); Hitoshi Urakami, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 10/904,515

(22) Filed: Nov. 15, 2004

(65) Prior Publication Data

US 2005/0104464 A1    May 19, 2005

(30) Foreign Application Priority Data

Nov. 14, 2003  (JP) .............................. 2003-385368
Mar. 25, 2004  (JP) .............................. 2004-088249

(51) Int. Cl.
*H02K 5/16* (2006.01)
*G03B 21/00* (2006.01)

(52) U.S. Cl. ...................................... 310/90; 310/67 R
(58) Field of Classification Search .................. 310/90; 384/276, 279, 286
See application file for complete search history.

(56) References Cited

U.S. PATENT DOCUMENTS

| | | | | |
|---|---|---|---|---|
| 5,441,386 | A * | 8/1995 | Hsieh | 415/230 |
| 6,082,903 | A * | 7/2000 | Saneshige | 384/279 |
| 6,236,129 | B1 * | 5/2001 | Yamashita | 310/90 |
| 6,339,275 | B1 * | 1/2002 | Katagiri | 310/261 |
| 6,384,495 | B1 * | 5/2002 | Suzuki et al. | 310/67 R |
| 6,517,247 | B1 * | 2/2003 | Cheng | 384/279 |
| 6,657,342 | B1 * | 12/2003 | Kodama | 310/90 |
| 6,755,554 | B1 | 6/2004 | Ohmae et al. | |
| 6,832,853 | B1 * | 12/2004 | Fujinaka | 384/100 |
| 6,834,996 | B1 * | 12/2004 | Gomyo et al. | 384/100 |
| 2003/0024099 | A1 * | 2/2003 | Gomyo | 29/525.01 |
| 2004/0190802 | A1 * | 9/2004 | Gomyo et al. | 384/100 |
| 2005/0058374 | A1 * | 3/2005 | Gomyo et al. | 384/119 |

FOREIGN PATENT DOCUMENTS

| | | |
|---|---|---|
| JP | U-H03-106862 | 11/1991 |
| JP | A-H05-344675 | 12/1993 |
| JP | 7-199105 | 8/1995 |
| JP | A-H08-98447 | 4/1996 |
| JP | B-2620393 | 3/1997 |
| JP | A-H09-294350 | 11/1997 |
| JP | A-H10-30640 | 2/1998 |
| JP | 2000-82252 | * 3/2000 |

* cited by examiner

*Primary Examiner*—Burton Mullins
(74) *Attorney, Agent, or Firm*—Westerman, Hattori, Daniels & Adrian, LLP (57) ABSTRACT

The present invention can make the motor life of a motor be longer under the high temperature environment. The motor has a sleeve which is formed by a porous material made of a metal powder and the sleeve is held in a cylindrical sleeve holding part. An annular concave gap is formed between the sleeve and the sleeve holding part. In this annular concave gap, a member which can keep an excess oil is inserted. A first upper inner peripheral part of the sleeve holding part has a first minute gap between an outer peripheral surface of the sleeve, and the first minute gap has an enough width for an adhering oil to be absorbed by the sleeve when the adhering oil adheres to the first minute gap.

16 Claims, 7 Drawing Sheets

MOTOR AND DISPLAY UNIT

BACKGROUND OF THE INVENTION

1. Field of the Invention

The present invention relates to a motor for driving a rotary color filter that is used for projecting and displaying a color picture image and relates to a display unit employing this motor.

2. Description of Related Art

According to a projector in a DLP (Digital Light Processing) system, by rapidly rotating a color wheel having three color filters of R (red), G (green), and B (blue) (hereinafter, abbreviated as "RGB") pasted onto a circular disk, a light emitted from a light source is transmitted through these color filters so that the color lights R, G, and B are sequentially extracted. These extracted color lights are illuminated to a predetermined digital micro mirror device (hereinafter, abbreviated as "DMD") in synchronization with rotation of the color wheel. Then, reflection lights from the DMD are introduced to a predetermined screen and a color picture image is formed and displayed there.

As a conventional motor for rotating a color wheel, one that a shaft to which the color wheel is attached is rotatably supported by a sliding bearing referred to as a sleeve bearing has been known (Japanese Unexamined Pat. App. Pub. No. H05-344675). In this case, the sleeve bearing is made by inserting a shaft in an inner periphery of a sleeve which is impregnated with oil in a cylindrical porous material, and the sleeve bearing serves to support the shaft to be rotated while decreasing friction by forming an oil film between the sleeve bearing and the shaft with oil discharged from the inner periphery of the sleeve.

In the meantime, in the projector in the DLP system, a temperature of inside of a case becomes high due to heat generated from a light source. In recent years, in the projector in the DLP system, an output power of the light source tends to be large in order to improve a picture quality of the projector and a caloric value is also increased. For example, a temperature in the case may be 85° C. and more.

Under such a high temperature environment, a conventional motor for driving a rotary color wheel using the sleeve bearing has a defect that the oil of the sleeve bearing easily vaporizes and the oil is decreased for a short period of time. If the oil is decreased lower than a predetermined amount, the sleeve bearing cannot rotatably support the shaft normally. Therefore, in the conventional motor for rotary driving of a color wheel, an abnormal sound is generated from the sleeve bearing or the picture quality of the projector is deteriorated for a short period of time.

In addition, the conventional motor for driving a rotary color wheel may be attached depending on an arrangement of parts in the case of the projector so that a rotational axis of the motor is attached in the horizontal direction. The motor that is attached in this way cannot be used for a long period of time because the oil of the sleeve bearing easily flows out to the outside due to gravity.

BRIEF SUMMARY OF THE INVENTION

An object of the present invention is to make a life of a motor for driving a rotary color wheel using a sleeve bearing be longer. In addition, another object of the present invention is to make a life of a display unit in a DLP system be longer.

The motor of the present invention is characterized in that the motor holds more oil in the sleeve bearing and the motor makes difficult to leak the oil to the outside of the bearing in order to make the motor life be longer under the high temperature environment.

The sleeve is formed by a porous material made of a metal powder with a predetermined aperture ratio and the sleeve is held in a cylindrical sleeve holding part having a lower bottom. Then, an annular concave gap is formed between this sleeve and the sleeve holding part. In this annular concave gap, a member including oil (hereinafter, referred to as an oil impregnating member) is inserted so as to abut against an outer peripheral part of the sleeve. For example, this oil impregnating member is a fiber member or the like and as the oil impregnating member, a material capable of holding oil more than the porous material forming the sleeve is selected. In addition, this annular gap is only formed on the inner peripheral surface of the sleeve holding part, however, the annular gap may be formed on the outer peripheral surface of the sleeve bearing as an annular concave portion or the both of the inner and outer peripheral surface may be employed. This oil impregnating member supplies an appropriate oil to the sleeve bearing. Thereby, the sleeve bearing has a more amount of oil than usual by having the additional oil held by the oil impregnating member, so that the motor life is made longer.

The radially outer bottom of the annular concave gap has a first diameter. The sleeve holding part has a first upper inner peripheral part that has a second diameter which is shorter than the first diameter and is located at an upper location than the location of the annular concave portion, the first upper inner peripheral surface is opposed to the outer peripheral part of the sleeve via a first minute gap. A gap width of this first minute gap is enough for the oil attached to the opposed surface forming the first minute gap to be absorbed by the sleeve in a relation with the aperture ratio of the sleeve.

In other words, the first minute gap is very narrow, so that, if the oil is remained to be held in the gap between the first upper inner peripheral part of the sleeve holding part and the sleeve outer peripheral surface, this held oil is diffused and flows out on the surface of the first upper inner peripheral part by oil migration to flow out toward outside. As a result, amount of the held oil of the sleeve bearing is decreased and the duration of life of the bearing becomes shorter.

On the other hand, if the first minute gap is made wider and a surface tension of the oil held in this gap is made smaller, an absorption power of the oil onto the opposed sleeve surface becomes relatively stronger than the surface tension and the oil attached to the first minute gap is absorbed into the sleeve. As a result, there is no oil that is diffused on the surface of the first upper inner peripheral part by the oil migration. Then, without decreasing the amount of the held oil of the sleeve bearing, the duration of life of the bearing is made longer. This absorption power of the oil may depend on the aperture ratio of the porous material of the sleeve. In other word, the smaller the aperture ratio is, the more the absorption power becomes.

In addition, it is also effective to apply an oil repellant material on the first upper inner peripheral part. Thus, by keeping accumulation of the oil in the first minute gap to a minimum, it is possible to effectively prevent migration diffusion of the oil through this first upper inner peripheral part.

In addition, if an annular cap is fixed so as to fill the upper end surface of the sleeve and the upper part of the first minute gap, leakage of the oil can be prevented more. Further, even if a labyrinth seal is constructed outside of the sleeve, leakage of the oil can be prevented more.

In addition, in the display unit of the present invention, a motor having a sleeve bearing in which a shaft is supported by a sleeve made of a porous material, which impregnated with oil, is mounted for driving a rotary color wheel. This motor is characterized in that the oil of the sleeve bearing is more held or the oil is prevented from leaking outside of the bearing. Thereby, even if this motor is used under the high temperature environment, the oil is held at the sleeve bearing for a long period of time, so that the duration of time of the motor is made longer. Therefore, the duration of time of a display unit is also made longer.

DETAILED DESCRIPTION OF THE INVENTION

Figure 1:
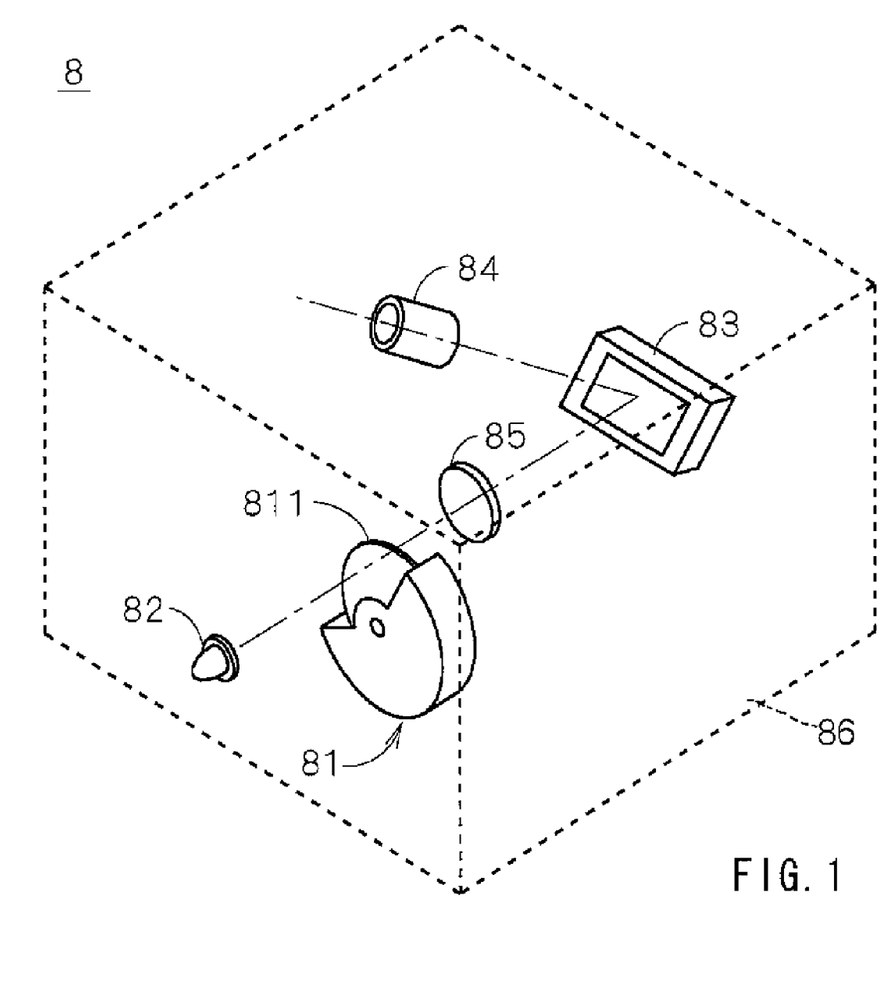
FIG. 1 is a schematic diagram of a display unit according to an embodiment of the present invention.

FIG. 1 is a schematic diagram of a display unit according to an embodiment of the present invention. This display unit is a projector 8 in a DLP system to project and display a color image on a predetermined screen and is characterized by a motor that is mounted for rotating and driving a color wheel to be described later.

The projector 8 is provided with a color wheel assembly 81 in which a color wheel 811 made by pasting three color filters, namely, R, G, and B on a circular disk is attached to a rotational part of a motor to be described later, a light source 82 for emitting the light toward the color wheel 811, a DMD 83 to which the color light transmitted through the color wheel 811 is irradiated in synchronization with rotational of the color wheel, a projection optical system 84 in which the reflection light from the DMD 83 is projected on a predetermined screen, and a case 86 to contain these respective mechanisms.

The color wheel 811 rapidly rotates with a central fitting hole fit and fixed at the rotational part of the motor. In the DMD 83, minute and many reflection mirrors are arranged in a second dimension so that their postures are changeable. Any color light among R, G, and B transmitted through the color wheel 811 is introduced to each reflection mirror of the DMD 83 via a condenser lens 85. The color light introduced to each reflection mirror is reflected toward the projection optical system 84 or a predetermined position that is different from the projection optical system 84 in response to a posture of each reflection mirror, and the color light to enter the projection optical system 84 is only projected on the screen. In this case, in response to a signal to be inputted from the outside, the DMD 83 is controlled in synchronization to a rotational angle of the color wheel 811 and the posture of each reflection mirror is rapidly changed. Thereby, in the projector 8, in response to an input signal, a picture image (a R picture image, a G picture image, and a B picture image) is rapidly changed so that a color moving picture is projected on the screen. The light emitted from the light source 82 has output enough to illuminate the screen and its caloric value is high. As a result, a temperature in the case 86 becomes high.

The motor according to the present invention is mounted on the above-described display unit. As the bearing of this motor, an oil impregnating sleeve bearing is used. This motor is characterized by holding oil more with the oil impregnating material provided at the sleeve bearing or preventing the oil from leaking outside of the bearing. If this motor is mounted for rotational driving of the color wheel of the above-described projector 8, the duration of life of the projector 8 is made longer.

Three embodiments of the motor will be illustrated by an example and be described below.

Figure 2:
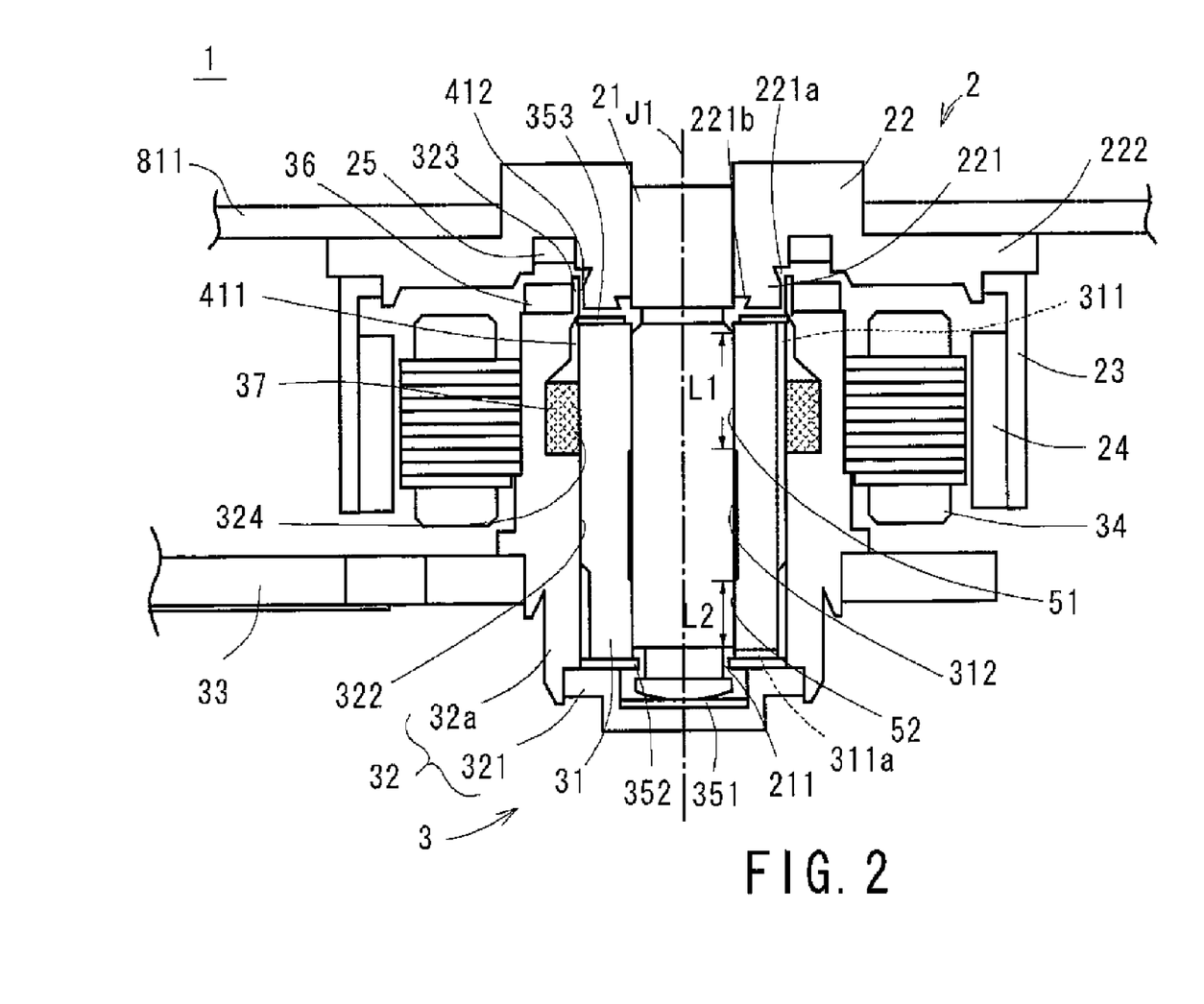
FIG. 2 is a cross sectional view of a motor according to a first embodiment of the present invention.

FIG. 2 is a cross sectional view of a motor 1 according to a first embodiment of the present invention. A motor 1 is provided with a rotational part 2, a stationary part 3, and a sleeve bearing.

The rotational part 2 has a hub 22 of a substantially circular disk on which a shaft 21 is fixed at its center. At an upper of the shaft 21, a boss part 221 (equivalent to a peripheral wall portion at the rotation side) surrounding a center axis J1 of the shaft 21 in a substantially cylindrical form is formed. On an outer peripheral surface of the boss part 221, a contracted diameter part 221a of which diameter is contracted upward is formed. At an inner edge of a lower end of the boss part 221, a contracted diameter part 221b in which a diameter of an inner peripheral wall at the outside is enlarged upwards is formed. In the case that oil of the sleeve bearing to be described later moves on the surface of the boss part 221 from an outer peripheral surface of the shaft 21, contracted diameter parts 221a and 221b acquire the oil. Thereby, it is possible to prevent the oil from flowing out toward the outside of the motor through a surface of the boss part 221.

At an outer peripheral part of a hub 22, a color wheel mounting part 222 for mounting the color wheel 811 is formed. The color wheel 811 is fixed on the hub 22 by using a predetermined attaching member (its illustration is herein omitted). At an outer peripheral part of the color wheel mounting part 222, an annular yoke 23 is fixed. On an inner peripheral surface of the yoke 23, an annular magnetic for a magnetic field system 24 is fixed.

The stationary part 3 has a sleeve holding part 32 shaped in a substantial cylindrical form with a bottom in which a sleeve 31 is inserted. The sleeve 31 is a cylindrical body made of a porous material (for example, a porous sintered body) having a predetermined aperture ratio impregnated with oil. The aperture ratio is equivalent to porosity. A sleeve holding part 32 is configured by a substantially cylindrical body 32a to press fit the sleeve 31 on an inner peripheral surface and a cover 321 to block an opening at a lower side of this substantially cylindrical body 32a. On an upper surface of the cover 321, a thrust plate 351 made of a synthetic resin is held. In the sleeve 31, the oil discharged from the inner peripheral surface of the sleeve 31 by inserting the shaft 21 therein forms an oil film between the inner peripheral surface of the sleeve 31 and the outer peripheral surface of the shaft 21 so as to form a sleeve bearing to support the rotational part 2 rotatably. The sleeve 31 supports load acting in a radial direction of the shaft 21 rotatably. The thrust plate 351 supports the load in the thrust direction acting on the shaft 21 rotatably when a lower end of the shaft 21 slides.

The sleeve holding part 32 is inserted and fixed in a penetration hole that is formed in a base plate 33 elongated in a vertical direction to the center axis J1. On the outer peripheral surface of the sleeve holding part 32, a stator 34 is fixed with a winding wire provided at plural projected poles formed as an annular core. The stator 34 is opposed to the magnet for a magnetic field system 24 in a radius direction.

The magnet for a magnetic field system 24 and the stator 34 may generate a torque rotating the rotational part 2 around the stationary part 3 centering on the center axis J1 by supplying a predetermined current to the stator 34 from the outside.

The shaft 21 is configured so as not to come off from the sleeve 31 by a retaining mechanism that is structured at the lower end of the shaft 21. This retaining mechanism is constructed by fitting a retaining member 352 put between the sleeve 31 and the cover 321 with an annular groove 211 of the shaft 21 with non-contact. In addition, in order to rotate the rotating part 2 stably, a magnet for thrust suction 25 fixed on the lower surface of the hub 22 magnetic attracts a magnet body 36 that is fixed on the upper end surface of the sleeve holding part 32 to a thrust direction.

On an outer peripheral surface of the sleeve 31, a plurality of longitudinal grooves 311 is arranged at intervals in a circumferential direction. On a lower end surface of the sleeve 31, a plurality of lateral grooves 311a is arranged at intervals in a circumferential direction. These longitudinal groove 311 and the lateral groove 311a act as a breathing path for discharging air in the sleeve 311 to the outside upon insertion of the shaft 21 in the sleeve 31. Thereby, the shaft 21 is easily inserted in the sleeve 31 when assembling the motor.

On an inner peripheral surface of the sleeve 31, an upper side sliding part 51 is provided at an upper end side, a lower side sliding part 52 is provided at a lower end side, and a cutout part 312 is disposed between both sliding parts 51 and 52. An axial length L1 of the upper side sliding part 51 is longer than an axial length L2 of the lower side sliding part 52. A weighted center of the rotational part 2 is located in the vicinity of a substantially center of the shaft 21, so that the load in a radial direction of the rotational part 2 largely acts on the upper side sliding part 51. Therefore, the upper side sliding part 51 requires more oil. The upper side sliding part 51 can support the shaft 21 stably because a felt 37 to be described later is arranged on an outer peripheral surface of the upper side sliding part 51 and oil is supplied to the upper side sliding part 51 more than to the lower side sliding part 52.

On an inner peripheral surface 322 at the upper side of the sleeve holding part 32, an annular concave part 324 is formed in a circumferential direction centering the center axis J1. In the annular concave part 324, a cylindrical felt 37 bearing the oil is contained. An inner peripheral surface of the felt 37 abuts against an outer peripheral surface of the sleeve 31. The oil of the felt 37 is supplied to the sleeve 31. The felt 37 serves as an oil refill mechanism to refill oil impregnating the sleeve 31. In the meantime, a material other than the felt may be available if it can hold oil.

The annular concave part 324 is located near the opening side of the sleeve holding part 32, so that a machining operation with a cutting tool and the insertion operation of the felt 37 can be easily made. The upper side surface of the annular concave part 324 is contracted because the cutting tool upon the machining is guided obliquely.

Figure 3:
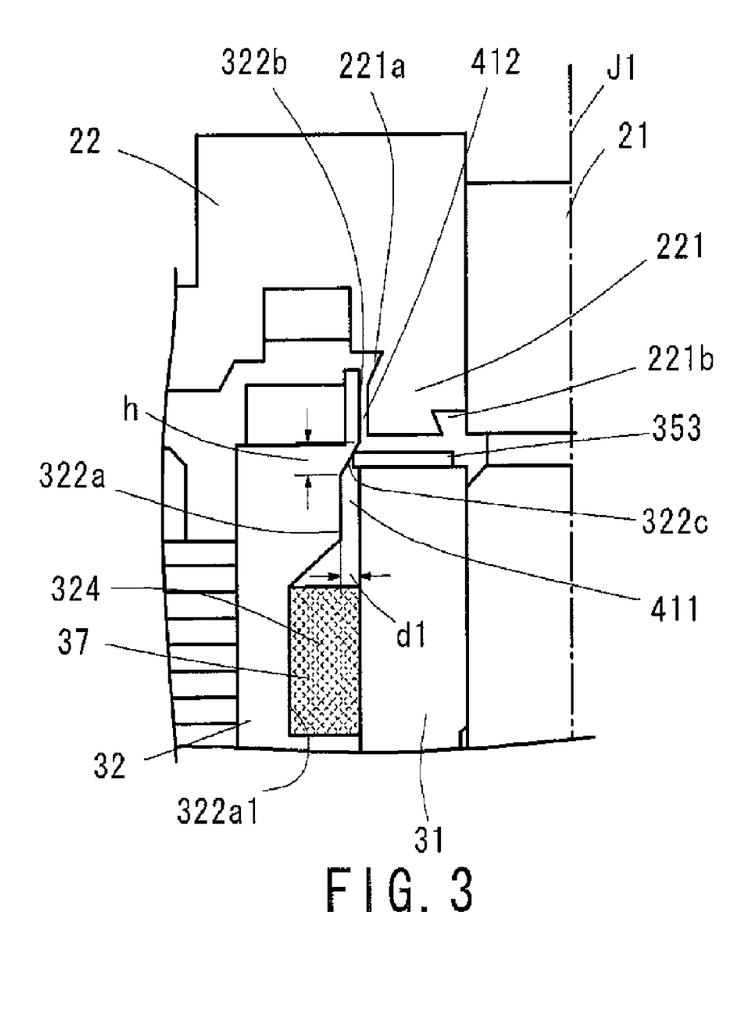
FIG. 3 is an enlarged view of substantial parts of FIG. 2.

As shown in FIG. 3, the sleeve holding part 32 is provided with a press fitting surface 322 to press fit the sleeve bearing 31 at the lower side of the annular concave part 324, a first upper inner peripheral surface 322a with a larger inner diameter than the inner diameter of the press fitting surface 322 at the upper side of the annular concave part 324, and further, a second upper inner peripheral surface 322b with a smaller inner diameter than the inner diameter of the first upper inner peripheral surface 322a at the upper side of the first upper inner peripheral surface 322a. The first upper inner peripheral surface 322a is located at an inner location than the annular radial bottom 322a1 of the annular concave part 324, and the first upper inner peripheral surface 322a is opposed to the outer peripheral surface of the sleeve 31 via a first minute gap 411. The inner diameter of the second upper inner peripheral surface 322b is the same as that of the press fitting surface 322. The first upper inner peripheral surface 322a and the second upper inner peripheral surface 322b are connected with each other via an inclined surface 322c of which inner diameter is contracted upward. The lower end of the inclined surface 322c is located at the substantially same height as the upper end surface of the sleeve 31.

On the upper end surface of the sleeve 31, a cylindrical cap 353 made of a synthetic resin is fixed. The cap 353 is secured by a surface tension of the oil discharged to the surface of the sleeve 31. An outer diameter of the cap 353 is larger than an inner diameter of the sleeve 31 and an inner diameter of the second upper inner peripheral surface 322b and further, is smaller than an inner diameter of the first upper inner peripheral surface 322a. A thickness of the cap 353 is the same as a height width h of the inclined surface 322c or not more than it. Therefore, the cap 353 may block the upper side of the first minute gap 411. As a result, the oil flowing on the opposed surface of the second minute gap 412 is prevented from leaking to the outside of the bearing. Even if the outer peripheral surface of the cap 353 and inclined surface 322c do not contact with each other, leakage of the oil can be prevented since the gap width formed between them is minute.

A gap width d1 of the first minute gap 411 has an enough gap measurement for the oil attached on the opposed surface forming the first minute gap 411 to be absorbed in the sleeve 31 in a relation with a predetermined aperture ratio of the sleeve 31.

In other words, if the gap width d1 is too small, the oil flowing out to the first upper inner peripheral surface 322a from the annular concave part 324 is held in the first minute gap 411 that is connected to the outer peripheral surface of the sleeve 31. Then, if the oil is kept to be held in the first minute gap 411, this oil is diffused on the first upper inner peripheral surface 322a by the oil migration to flow out outside. The oil is held in this gap 411 because the surface tension of the oil with connected between the opposed surfaces of this gap 411 is larger than the oil absorption force that the oil is absorbed in the outer peripheral surface of the sleeve 31.

On the other hand, if the gap width d1 of the first minute gap 411 is large, the surface tension of the oil to be held with connected between the opposed surfaces of this gap 411 becomes small. Therefore, the oil held in the gap 411 is absorbed in the sleeve 31 because the oil absorption force on the outer peripheral surface of the sleeve 31 is larger. As a result, the condition that the oil is held in this gap 411 is not formed, so that there is no oil to diffuse the first upper inner peripheral surface 322a by the oil migration and no oil flows out from the first upper inner peripheral surface 322a. Therefore, no oil flows off from the first minute gap 411 and the amount of the oil held in the sleeve bearing is not decreased, so that the duration of life of the bearing can be made longer. The oil absorption force of the sleeve 31 depends on the aperture ratio of the porous material of the sleeve 31. In other words, the smaller its aperture ratio is, the larger the oil absorption force becomes.

In addition, if the gap width d1 of the first minute gap 411 is too large, there are many regions contacting outer air in the both opposed surfaces of the first minute gap 411 and in the annular concave part 324, so that the oil easily vaporizes and this leads to decrease of the oil. Therefore, it is preferable that the gap width d1 is not too large.

As described above, it is preferable that the first minute gap 411 is set in a predetermined range. For example, 0.1 to 0.5 mm is preferable as the gap width d1. A diameter of a hole of the porous material to be normally used as a sleeve is not more than 0.1 mm, and if the d1 is defined no less than 0.1 mm, an advantage of the present invention can be sufficiently achieved. On the other hand, if this gap is defined too large, the strength of the sleeve holding part is decreased and the size thereof is increased. Therefore, the d1 not more than 0.5 mm is preferable. However, even if d1 exceeds this range, it is also possible to obtain the advantage of the present invention.

The second upper inner peripheral surface 322b is opposed to the outer peripheral surface of the boss part 221 via the second minute gap 412. The second minute gap 412 may construct the labyrinth seal. This labyrinth seal has an advantage to decrease circulation ability of air inside or outside of the second minute gap 412 so as to suppress vaporization of the oil. In addition, there is also an advantage to prevent the vaporized oil from flowing out outside of the motor.

Thus, the duration of life of the motor 1 is made longer since the sleeve bearing holds more oil by just that much of the oil held by the felt 37. Further, the oil of the felt 37 is prevented from leaking outside of the bearing by the first minute gap 411. The first minute gap 411 is blocked by the cap 353 so as to prevent leakage of the oil. In addition, leakage of the oil is also prevented by the operation of the labyrinth seal of the second minute gap 412. In other words, by suppressing leakage of the oil held in the sleeve bearing, the duration of time of the motor is made longer.

Figure 4:
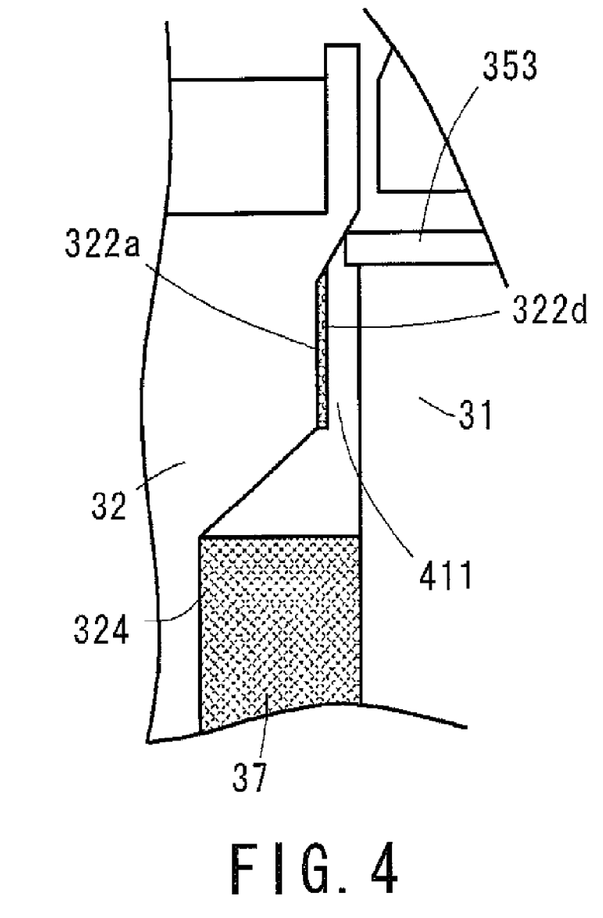
FIG. 4 is a modified example of the first embodiment according to the present invention.

In the mean time, according to the motor 1 of the present invention, as shown in FIG. 4, if an oil repellant film 322d is formed on the first upper inner peripheral surface 322a, it is possible to reject the oil by this oil repellant film 322d. Thereby, it is possible to prevent the oil discharged from the annular concave part 324 from reaching to the first upper inner peripheral surface 322a and the leakage of the oil can be more prevented.

Figure 5:
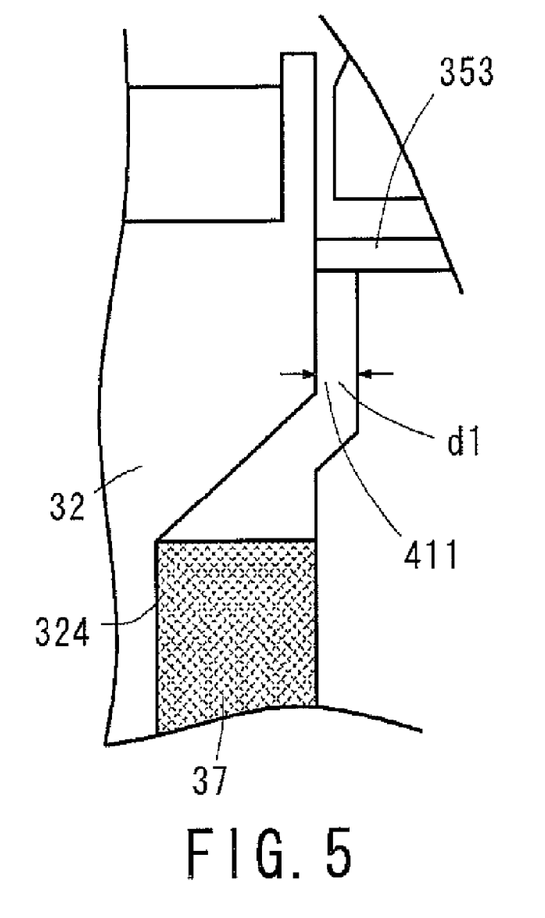
FIG. 5 is other modified example of the first embodiment according to the present invention.

According to the motor 1 of the present invention, as shown in FIG. 5, the first minute gap 411 may be formed so that the diameter of the upper outer peripheral surface of the sleeve 31 is made small and the inner diameter of the inner peripheral surface of the sleeve holding part 32 opposed to this is made small. In addition, the first minute gap 411 may be formed so that the both opposed surfaces of the sleeve 31 and the sleeve holding part 32 are scraped.

Figure 6:
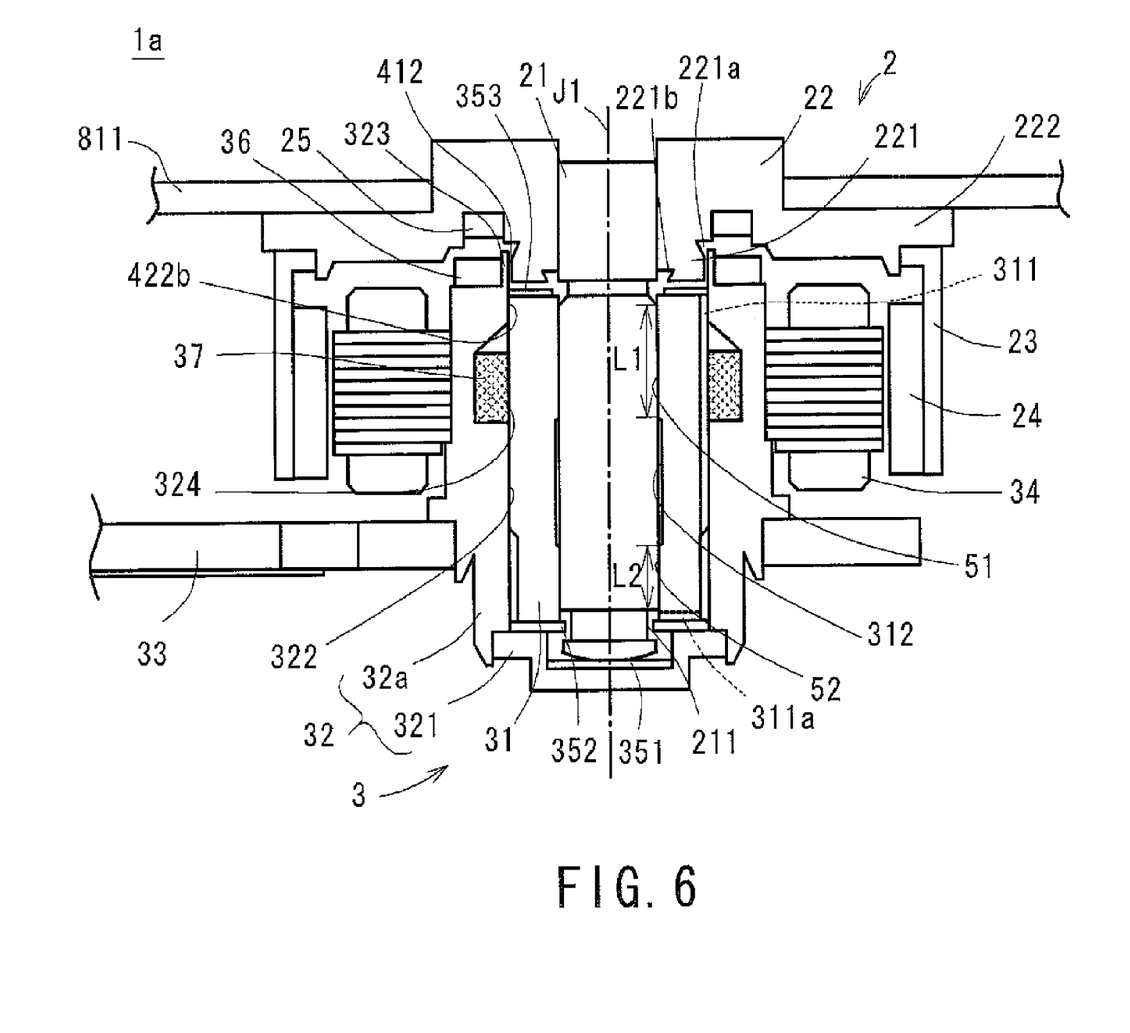
FIG. 6 is a cross sectional view of a motor according to a second embodiment of the present invention.

In the next place, a motor according to a second embodiment will be described with reference to FIG. 6. A basic configuration of a motor 1a of the second embodiment is the same as that of the motor 1 of the first embodiment, so that a difference point will be mainly described. In FIG. 6, the same reference numerals as those in FIG. 2 and FIG. 3 indicate the same members or the same regions as the first embodiment.

In the motor 1a shown in FIG. 6, a second upper inner peripheral surface 422b is formed to the annular concave part 324. Thereby, the press fitting part between the sleeve 31 and the sleeve holding 32 is configured upward and downward of the annular concave part 324. The sleeve holding part 32 of the present embodiment can be easily machined because its shape is simple as compared to that of the first embodiment. There is no inclined surface 322c according to the first embodiment, so that the cap 353 is secured on the upper end surface of the sleeve 31 with the outer diameter thereof slightly made smaller than the outer diameter of the sleeve 31.

Figure 7:
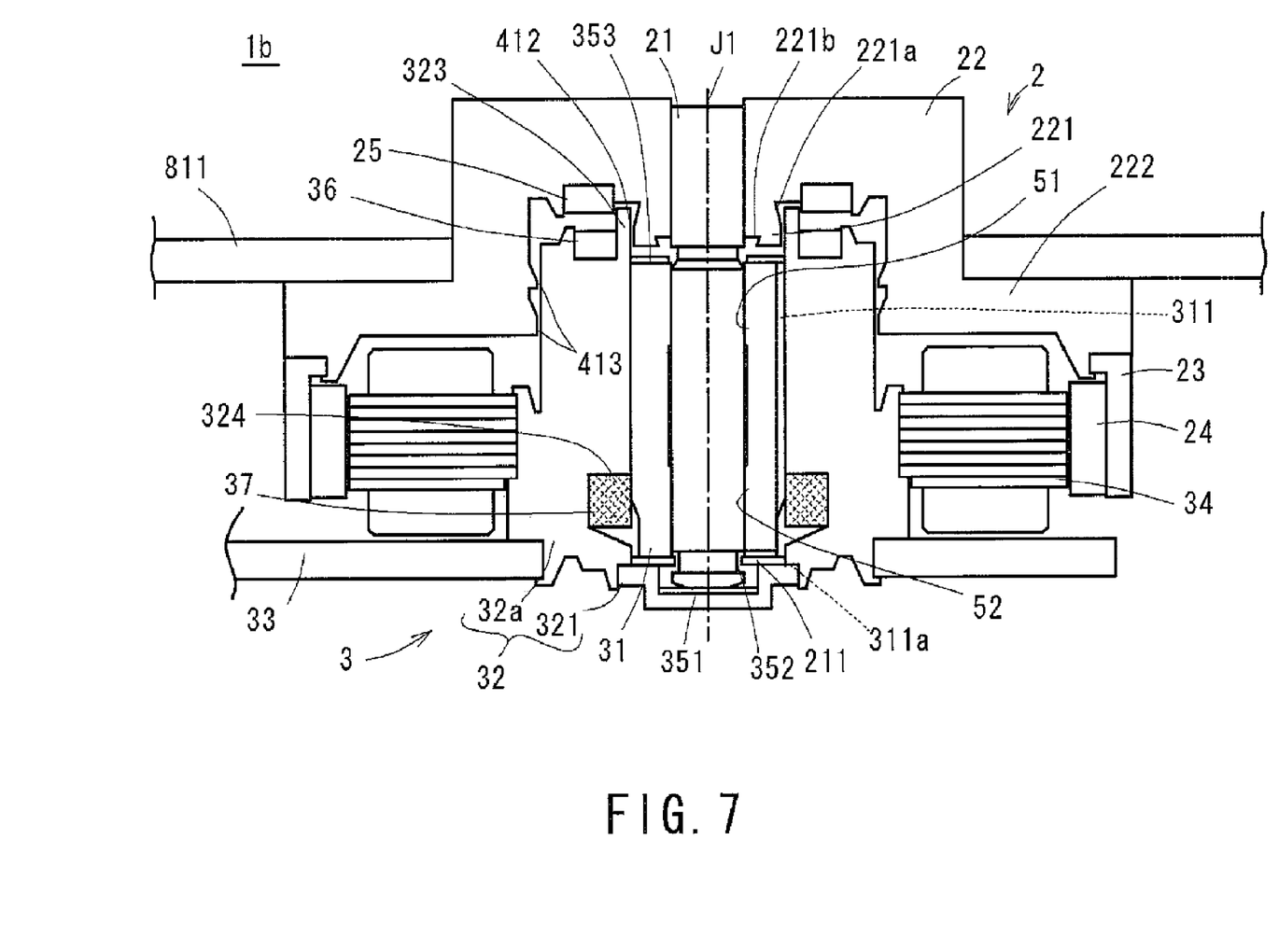
FIG. 7 is a cross sectional view of a motor according to a third embodiment of the present invention.

The duration of life of the motor 1a shown in FIG. 6 is made longer since the sleeve bearing holds more oil by just that much of the oil held by the felt 37. In addition, when it is difficult for the oil of the felt 37 to move upward of the annular concave part 324, for example, it is preferable that the motor 1a is attached so that the center axis J1 is directed vertically as shown in FIG. 7. Even if the oil is leaked from the upper side of the annular concave part 324 or flows out from the inner peripheral side of the sleeve 31, it is possible to prevent leakage of the oil by the labyrinth seal due to the second minute gap 412.

In the next place, a motor according to a third embodiment will be described with reference to FIG. 6. A basic configuration of a motor 1b of the third embodiment is the same as that of the motor 1a of the second embodiment, so that a difference point will be mainly described. In FIG. 7, the same reference numerals as those in FIG. 6 indicate the same members or the same regions as the second embodiment.

In the motor 1b shown in FIG. 7, the annular concave part 324 having the felt 37 according to the second embodiment is arranged at the lower side of the sleeve holding part 32. This annular concave part 324 is approximately located at the outer peripheral part of the lower side sliding part 52 of the sleeve 31. Thereby, the press fitting part between the sleeve 31 and the sleeve holding part 32 is configured on the upper side of the annular concave part 324 with a sufficient length.

Accordingly, this motor 1b can make the duration of life of the motor longer since the sleeve bearing holds more oil by just that much of the oil held by the felt 37. In addition, it is difficult for the oil of the felt 37 to leak to the outside through the press fitting part between the sleeve 31 and the sleeve holding part 32, so that reduction of the oil is prevented and the duration of life of the motor is made longer. In addition, even if this motor 1b is arranged so that the center axis J1 is made horizontal, the oil is hardly leaked to the outside of the bearing.

Further, in the motor 1b, the inner peripheral surface of the color wheel mounting part 222 is opposed to the outer peripheral surface of the sleeve holding part 32 via a third minute gap 413. The third minute gap 413 may construct the labyrinth seal. The third minute gap 413 can prevent leakage of the oil that has passed through the second minute gap 412.

Since the motors 1, 1a, and 1b of the above-described three embodiments are provided with the above-described oil refill mechanism, they hold the oil of the sleeve bearing more. Further, respective motors 1, 1a, and 1b are constructed so that the oil is hardly leaked. In other words, since these motors 1, 1a, and 1b are configured so that they can hold large amounts of oil and further, the oil hardly runs dry even if they are located under a high temperature environment, the bearing performance of the sleeve bearing is maintained for a long period. Therefore, if these motors 1, 1a, and 1b are used for rotary driving of the color wheel 811 of the above-described projector 8, it is possible to make the duration of life of the projector 8 longer. In addition, since these motors 1, 1a, and 1b are configured so that the oil is hardly leaked from the sleeve bearing, in a space where the color wheel 811 is located, purity can be kept.

The embodiments of the display unit and the motor according to the present invention are described as above, however, a scope of the present invention is not limited to the above-described embodiments and various modifications will become possible without departing from the scope thereof.

For example, the display unit according to the present invention may be a TV apparatus in a rear projection system to project and display a color picture image in the same system as that of the projector 8 without being limited to the projector 8.

In addition, in the motor according to the present invention, the above-described annular concave part 324 is formed at the opening side of the sleeve holding part 32; however, the annular concave part 324 may be formed at the outer peripheral surface of the sleeve 31. The felt 37 in this case, is made of a material capable of holding the oil more than the reduction amount of the oil holding amount that can be held by the sleeve 37 in order to form the annular concave part.

In addition, in the motor according to respective embodiments shown in FIGS. 2, 4, and 5 of the present invention, the felt 37 and the annular concave part 324 may be omitted. In the motor where these are omitted, it is possible to prevent leakage of the oil from a space between the outer peripheral surface of the sleeve 31 and the inner peripheral surface of the sleeve holding part 32 by the first minute gap 411 so that the duration of life of the motor can be made longer.

What is claimed is:

1. A motor used for driving a rotary color wheel having color filters pasted onto a circular disk to project and display a color picture image, the motor comprising a stationary part and a rotational part; wherein, the rotational part comprises:
  a hub,
  a magnet for driving, and
  a shaft of which an upper end is fixed to the hub;
the stationary part comprises:
  a cylindrical sleeve made of a porous material having a predetermined aperture ratio that is impregnated with oil,
  a sleeve holding part like a cup having a lower bottom, the sleeve being held at an inner peripheral surface of the sleeve holding part, and the shaft being inserted into an inner peripheral surface of the sleeve, wherein an oil film is formed between the sleeve and the shaft supporting the rotational part; and
  a stator fixed to an outer peripheral surface of the sleeve holding part opposed to the magnet;
and the sleeve holding part comprises:
  an annular concave portion that is trenched outward in the radial direction formed at an inner peripheral surface of the sleeve holding part having an annular radially outward bottom with a first diameter;
  an oil impregnating member that is impregnated with the oil, held in the annular concave portion and abutting on an outer peripheral surface of the sleeve, and
  a first upper inner peripheral part of the sleeve holding part that has a second diameter smaller than the first diameter and that is located above the annular concave portion, the first upper inner peripheral part being opposed to an outer peripheral surface of the sleeve via a first minute gap,
  wherein a gap width of the first minute gap has enough dimension for an adhering oil to be absorbed by the sleeve depending on the aperture ratio of the sleeve when the adhering oil adheres to the first minute gap.

2. The motor according to claim 1,
wherein the gap width of the first minute gap is 0.1 to 0.5 mm.

3. The motor according to claim 2,
wherein the first upper inner peripheral part is coated with an oil repellant material.

4. The motor according to claim 3,
wherein the sleeve holding part has a second upper inner peripheral part of which the inner diameter is smaller than that of the first upper inner peripheral part, and wherein the second upper inner peripheral part is located above the upper end surface of the sleeve and above the first upper inner peripheral part, and is opposed to a peripheral wall part of the rotational part surrounding an upper end portion of the shaft via a second minute gap.

5. The motor according to claim 4, wherein
a conical surface is located between the first upper inner peripheral part and the second upper inner peripheral part to connect these two upper inner peripheral parts;
an annular cap is located on an upper end surface of the sleeve, wherein an outer diameter of the annular cap is shorter than the inner diameter of the first upper inner peripheral part, and is larger than an inner diameter of the second upper inner peripheral part, and wherein a thickness of the annular cap is equal to or not more than a height of the conical surface; and wherein an outer peripheral end portion of the annular cap is opposed to the conical surface.

6. The motor according to claim 5,
wherein two sliding parts are located at the inner peripheral surface of the sleeve to support the shaft slidably and a cutout part is located between the two sliding parts on the inner peripheral surface of the sleeve; and
at least a part of the oil impregnating member is located at one of the two sliding parts which is nearer to a weighted center of the rotational part than the other of the two sliding parts.

7. The motor according to claim 6,
wherein the rotational part is opposed to the outer peripheral part of the sleeve holding part via a third minute gap.

8. A motor used for driving a rotary color wheel having color filters pasted onto a circular disk to project and display a color picture image, the motor comprising a stationary part and a rotational part; wherein, the rotational part comprises:
  a hub,
  a magnet for driving, and
  a shaft of which upper end is fixed to the hub;
the stationary part comprises:
  a cylindrical sleeve made of a porous material having a predetermined aperture ratio that is impregnated with oil,
  a sleeve holding part like a cup having a lower bottom, the sleeve being held at an inner peripheral surface of the sleeve holding part, and the shaft being inserted into an inner peripheral surface of the sleeve, wherein an oil film is formed between the sleeve and the shaft supporting the rotational part; and
  a stator fixed to an outer peripheral surface of the sleeve holding part opposed to the magnet;
and the sleeve holding part comprises:

an upper inner peripheral part of the sleeve holding part that is located at an upper location of the sleeve holding part opposed to an outer peripheral surface of the sleeve via a minute gap,
wherein a gap width of the minute gap has an enough dimension for an adhering oil to be absorbed by the sleeve depending on the aperture ratio of the sleeve when the adhering oil adheres to the minute gap.

9. The motor according to claim 8,
wherein the gap width of the minute gap is 0.1 to 0.5 mm.

10. The motor according to claim 9,
wherein the upper inner peripheral part is coated with an oil repellant material.

11. A motor used for driving a rotary color wheel having color filters pasted onto a circular disk to project and display a color picture image, the motor comprising a stationary part and a rotational part; wherein,
the rotational part comprises:
a hub,
a magnet for driving, and
a shaft of which upper end is fixed to the hub;
the stationary part comprises:
a cylindrical sleeve made of a porous material having a predetermined aperture ratio that is impregnated with oil,
a sleeve holding part like a cup having a lower bottom, the sleeve being held at an inner peripheral surface of the sleeve holding part, and the shaft being inserted into an inner peripheral surface of the sleeve, wherein an oil film is formed between the sleeve and the shaft supporting the rotational part; and
a stator fixed to an outer peripheral surface of the sleeve holding part opposed to the magnet;
and the sleeve holding part comprises:
an annular concave portion that is trenched outward in radial direction, formed at an inner peripheral surface of the sleeve holding part;
an oil impregnating member that is impregnated with the oil, held in the annular concave portion for abutting on an outer peripheral surface of the sleeve.

12. The motor according to claim 11,
wherein two sliding parts are located at an inner peripheral surface of the sleeve to support the shaft slidably and a cutout part is located between the two sliding parts on the inner peripheral surface of the sleeve; and
at least a part of the oil impregnating member is located at one of the two sliding parts which is nearer to a weighted center of the rotational part than the other of the two sliding parts.

13. The motor according to claim 11,
wherein two sliding parts are located at the inner peripheral surface of the sleeve to support the shaft slidably and a cutout part is located between the two sliding parts on the inner peripheral surface of the sleeve; and
the oil impregnating member is located at one of the two sliding parts which is nearer to the lower bottom of the sleeve holding part than the other of the two sliding parts.

14. A display unit comprising:
a color wheel assembly including
a rotary color wheel having color filters pasted onto a circular disk to project and display a color picture image; and
a motor for driving the color wheel;
a light source to emit a source light toward the color wheel;
a digital micro mirror device for reflecting a light transmitted through the color wheel by many minute reflecting mirrors of which their postures are changeable depending on the color picture image;
a projection optical system for projecting the light reflected from the digital micro mirror device on a predetermined screen; and
a case for housing the color wheel assembly, the light source, the digital micro mirror device, and the projection optical system;
wherein the motor comprises a stationary part and a rotational part; wherein,
the rotational part comprises:
a hub,
a magnet for driving, and
a shaft of which upper end is fixed to the hub;
the stationary part comprises:
a cylindrical sleeve made of a porous material having a predetermined aperture ratio that is impregnated with oil,
a sleeve holding part like a cup having a lower bottom, the sleeve being held at an inner peripheral surface of the sleeve holding part, and the shaft being inserted into an inner peripheral surface of the sleeve wherein an oil film is formed between the sleeve and the shaft supporting the rotational part; and
a stator fixed to an outer peripheral surface of the sleeve holding part opposed to the magnet;
and the sleeve holding part comprises:
an annular concave portion that is trenched outward in the radial direction formed at an inner peripheral surface of the sleeve holding part having an annular radially outward bottom with a first diameter;
an oil impregnating member that is impregnated with the oil, held in the annular concave portion for abutting an outer peripheral surface of the sleeve, and
an upper inner peripheral part of the sleeve holding part that has a diameter smaller than the first diameter and that is located above the annular concave portion, the upper inner peripheral surface being opposed to an outer peripheral surface of the sleeve via a minute gap,
wherein a gap width of the minute gap has enough dimension for an adhering oil to be absorbed by the sleeve depending on the aperture ratio of the sleeve when the adhering oil adheres to the minute gap.

15. The display unit according to claim 14,
wherein the gap width of the minute gap is 0.1 to 0.5 mm.

16. The display unit according to claim 15,
wherein the upper inner peripheral part is coated with the oil repellant material.

* * * * *